United States Patent

[11] 3,584,445

[72] Inventor Stephen R. Hubbard
Stockton, Calif.
[21] Appl. No. 855,560
[22] Filed Sept. 5, 1969
[45] Patented June 15, 1971
[73] Assignee Universal Harvester Co., Inc.
Stockton, Calif.

[54] MODULAR REEL STRUCTURE
10 Claims, 3 Drawing Figs.

[52] U.S. Cl. ............................................. 56/220
[51] Int. Cl. ............................................ A01d 57/02
[50] Field of Search .......................... 56/220–
—227; 285/363, 368, 405, 412; 287/129, 130,
52.03; 242/118.41

[56] References Cited
UNITED STATES PATENTS
686,823 11/1901 Macphail .................. 56/220
1,013,636 1/1912 Bennett ....................... 56/223

2,627,158 2/1953 Van Sickle .................. 56/221

Primary Examiner—Louis G. Mancene
Assistant Examiner—J. A. Oliff
Attorney—Joseph B. Gardner ABSTRACT: A reel structure of the type used in harvesting machinery to harvest grain and similar grasslike crops, and in cultivating machinery to work or condition the ground. Such reel structure includes an elongated center shaft supported for rotation about the longitudinal axis thereof, and it is equipped at longitudinally spaced locations therealong with drive spiders each of which has radially extending spokes. The spokes of successive spiders are aligned in longitudinally spaced pairs and respectively support rotatable bat assemblies therebetween having fingers that project therefrom to engage the crop or ground as the case may be. The present invention utilizes connector flanges carried by the center shaft and cooperative with the drive spiders in a particular manner to mount the drive spiders upon the center shaft and effect a torque-transmitting interconnection therebetween.

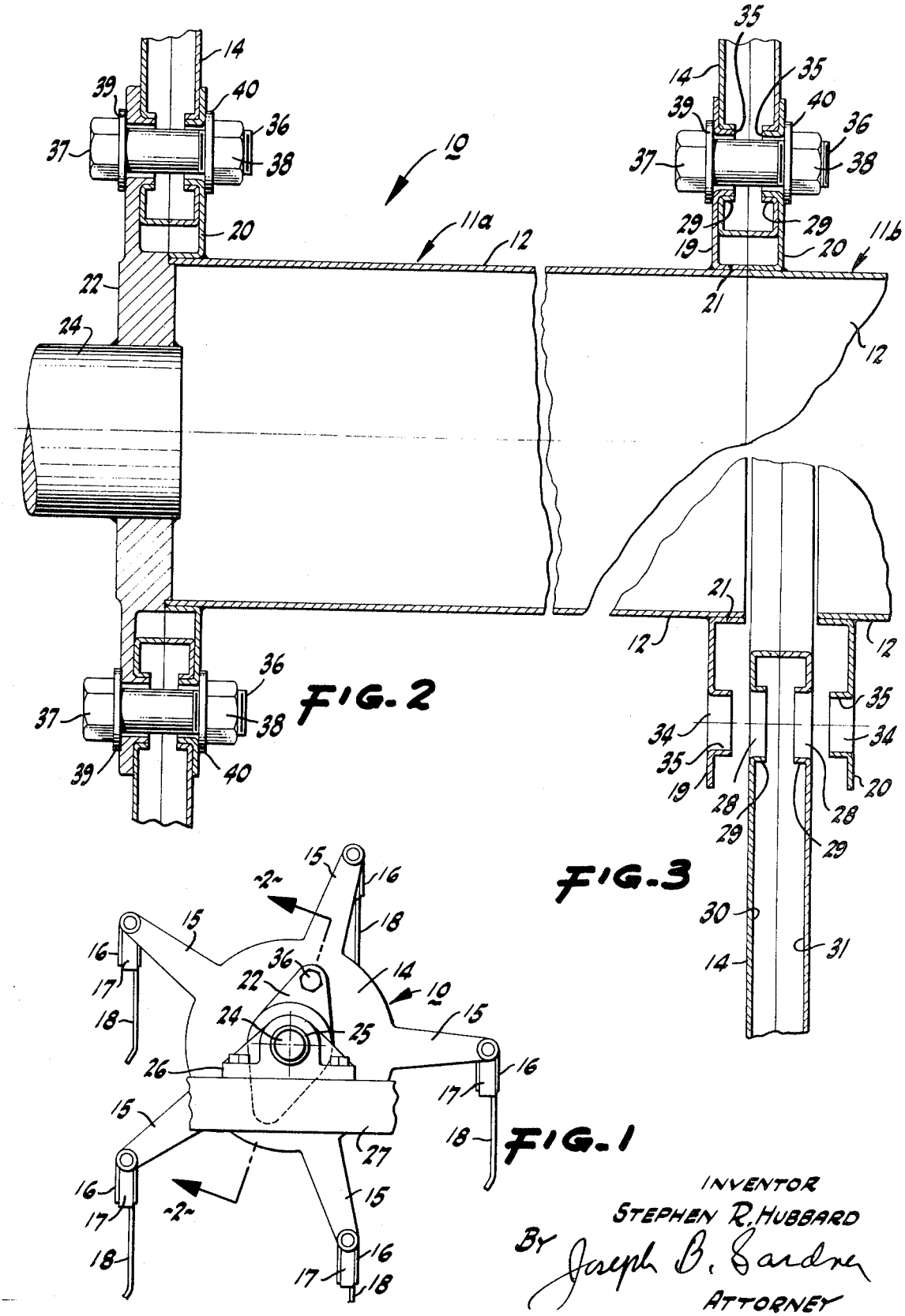

MODULAR REEL STRUCTURE

Disclosure

This invention relates generally to harvesting machinery and to ground-cultivating machinery and, more particularly, to the reel structures used in swathers, combines, hay rakes, and like harvesting machinery and in harrows, scarifiers and like cultivating machinery.

Machinery of the type being considered typically includes relatively large reel structures that are horizontally disposed, and as the machinery moves through a field, the reels are rotatably driven to gather the growing crop (and feed it to a cutter bar, for example) in the case of harvesting machinery or to engage and disturb the ground in the case of cultivating machinery. These reel structures may be of different types but are generally similar in a mechanical sense, and considering a pickup reel as a typifying example, it is provided with an elongated center shaft supported for rotation about the longitudinal axis thereof and equipped at longitudinally spaced locations therealong with drive spiders which are rotatably driven thereby. The drive spiders have radially extending spokes or fingers that are spaced apart angularly, and the spokes of successive spiders are aligned in pairs to rotatably carry longitudinally extending bat assemblies having outwardly projecting fingers that are maintained in a generally vertical orientation as the reel structure rotates about its horizontally disposed longitudinal axis. During such rotation, the finger-equipped bat assemblies successively sweep downwardly into the crop to gather the same and urge it through the reel and against a cutter bar which severs the crop close to the ground.

Such reel structures vary substantially in length since no single size or length satisfies the harvesting requirements of different users and, as a consequence, manufactures and suppliers of such structures have been required in the past to stock a great variety of sizes which has resulted in considerable inventory expense and often causes inconvenience when a particular size required by a user was not available. In view of this, modular reel structures have been developed to enable reels of various lengths to be quickly and easily assembled so as to satisfy the particular size requests of different users without the necessity of inventorying vast stocks of reel structures of such various lengths; and a particular example of such a modular reel structure is disclosed in the commonly assigned copending Pat. application of Charles M. Gibson, Ser. No. 807,031, filed Mar. 13, 1969.

The present invention is concerned with an improved reel structure of the general type explained, and is more especially concerned with an improved modular reel structure such as that disclosed in the aforementioned commonly assigned copending Pat. application Ser. No. 807,031; and an object, among others, of the invention is to provide an improved reel structure in which the center shaft is formed in sections and in which such shaft sections and related components, including in particular the drive spiders, are conveniently and easily assembled to provide a composite reel structure having essentially the same functional and strength characteristics as those of a unitary or conventional reel structure.

Another object is in the provision of a modular reel structure having a plurality of shaft sections drivingly interconnected in axially aligned end-to-end succession, and having also a plurality of drive spiders mounted upon and connected with the shaft sections so as to be driven thereby; the shaft sections being automatically aligned and the drive spiders being automatically positioned in proper orientation and disposition thereon as part of the convenient assembly of the reel structure.

Still another object is that of providing an improved modular reel structure of the character described in which successive shaft sections are equipped with connector flanges at their adjacent ends and in which a drive spider is sandwiched between such flanges; cooperative bosses and recesses provided by the flanges and spider being effective to align the shafts and properly orient the various components, and also being effective to drivingly interconnect the shaft sections and spider to accommodate torque transmission therebetween.

Additional objects and advantages of the invention, especially as concerns particular features and details thereof, will become apparent as the specification develops.

An embodiment of the invention is illustrated in the accompanying drawing in which:

FIG. 1 is a broken end view in elevation of a modular reel structure embodying the invention;

FIG. 2 is a greatly enlarged broken longitudinal sectional view taken along the line 2–2 of FIG. 1; and FIG. 3 is a broken longitudinal sectional view illustrating successive flange-equipped drive shafts and a drive head or spider in spaced-apart relation.

The modular reel structure illustrated somewhat generally in FIG. 1 may be a pickup reel and it is denoted in its entirety with the numeral 10. As is evident in FIG. 2, the reel structure 10 comprises a plurality of successive modules or sections 11a, and 11b, which may be substantially identical although some slight variation in structural characteristics may occur as between the inner modules and the outer modules bordering the same on each side thereof. As indicated hereinbefore, the pickup reel structure 10 is intended to traverse a field having a crop ready to be harvested and, accordingly, the reel must be attached to or comprise a part of a vehicle operative to propel it about the field. Concerning such vehicle and the relationship of the reel structure thereto, both may be conventional and for purposes of specific identification and description, details pertinent thereto appear in the commonly assigned copending Pat. application of Thomas O'D. Connolly, Ser. No. 528,146, filed Feb. 16, 1966, now abandoned, and filed as a continuation in Pat. application No. 820,683, filed Apr. 30, 1969.

The reel structure 10 includes a longitudinally extending main or center shaft which in the modular reel construction shown comprises a plurality of shafts or shafts sections 12 respectively associated with the modules 11a and 11b and adapted to be drivingly interconnected in axially aligned end-to-end succession, as evident in FIG. 2. The shafts 12 are hollow tubular components, but as respects the present invention they could be of solid construction. Mounted upon the center shaft in a manner to be described in detail hereinafter are a plurality of drive heads or spiders 14 each of which is a substantially planar disclike element of generally cylindrical configuration equipped with angularly spaced, radially extending spokes or arms 15 integrally or otherwise fixedly related thereto. In the specific reel structure 10 shown, each of the drive spiders 14 is equipped with five radially extending arms 15 angularly spaced from each other by equal distances of 72° from center-to-center.

It will be appreciated that the radially extending arms 15 of all of the drive spiders 14 comprised by the reel structure 10 must be respectively aligned in an axial sense so that each successive pair of aligned arms can support a bat assembly 16 therebetween. Each such bat assembly 16 is supported by the arms 15 associated therewith for rotational movement with respect thereto so as to enable the bat assembly to maintain a predetermined orientation (generally vertical) as the reel structure 10 and drive spiders 14 thereon rotate about the longitudinal axis of the shafts 12. As respects the present invention, any suitable means may be employed to effect such rotational support of each bat assembly relative to the radial arms 15 associated therewith, and a specific example thereof is disclosed in the aforementioned commonly assigned copending Pat. application Ser. No. 807,031, filed Mar. 13, 1969.

Also, as explained in such copending application, each bat assembly 16 includes a bat bar 17 having a plurality of pickup fingers 18 mounted thereon; and control spiders (not shown) are provided adjacent the ends of the reel structure 10 and have a plurality of radially extending arms corresponding in number to the number of arms of the drive spiders 14 and connected by linkage to the bat assembly 16 thereof so to effect their rotation relative to the drive spiders 14 as the reel structure 10 is driven. Thus, the bat assemblies are maintained in a generally vertical orientation at all times as the reel structure traverses an arcuate path of 360° and, as explained in the aforementioned commonly assigned copending Pat. application Ser. No. 528,146 now abandoned, and filed as a continuation in Pat. application No. 820,683, filed Apr. 30, 1969, the control spiders are usually adjustable so that the orientation of the bat assembly 16 can be changed slightly to assure their most efficient coaction with the particular crop being harvested by the reel structure 10. It is evident that reference may be made to the aforementioned copending Pat. applications for details of the reel structure which are being omitted herein since not germane to the present invention.

Each shaft 12 is equipped adjacent the ends thereof with connector flanges 19 and 20 which are welded or otherwise fixedly related thereto so that relative rotation and relative axial displacements are prevented. The connector flanges 19 and 20 are identical and are simply reversely oriented at the opposite ends of each shaft 12 so that when two shafts are positioned in axially aligned end-to-end succession, as shown in FIG. 2, the adjacent flanges 19 and 20 are disposed in facing relation. Each connector flange is spaced slightly from the adjacent end of the shaft in the sense that it is turned laterally at its inner end to define a collar 21 that receives the associated shaft 12 therein so as to be coaxially circumjacent the same. In that the laterally extending portion of each flange is located along the inner edge of the collar 21, the flange may be considered to be spaced inwardly from the adjacent end of the shaft.

The connector flanges 19 and 20 may have various external configurations, circular for example, but in the form shown have the generally elongate shape shown in FIG. 1 by the connector flange 22 which is disposed adjacent an end of the reel structure 10. The connector flange 22, it may be observed, is essentially the counterpart of the connector flange 19 and it is used to transmit driving torque from an input shaft 24 to the shafts 12. The flange 22 may be relatively thick throughout the central portion thereof so as to provide considerable strength, and it has a central opening that receives the input shaft 24 therein to which it is welded or otherwise fixedly secured so as to prevent relative movement therebetween. The reel structure 10 is supported for rotation about the coincident longitudinal axis defined by the input shaft 24 and shafts 12, and for this purpose, the input shaft 24 may be journaled for rotation in bearing structure 25 provided by a pillow block 26 bolted or otherwise attached to a support 27. The input shaft 24 is rotatably driven by means, not shown, which can be completely conventional (usually a chain drive and sprockets are employed to rotate pickup reel structures of this type) and depending upon the characteristics of any particular reel structure, driving torque may be applied thereto at each end thereof.

The drive heads or spiders 14 and connector flanges 19 and 20 (and 22) are selectively provided with a plurality of recesses and bosses alignable with each other and dimensioned so that the bosses seat within the recesses aligned therewith. In this manner the spiders, flanges, and shafts are all aligned properly and a driving interconnection is defined between the connector flanges and associated spider sandwiched therebetween. In the particular form shown the spiders 14 are provided with the recesses and the connector flanges 19, 20 and 22 are provided with bosses selectively seatable within such recesses.

More particularly, and as is most evident in FIG. 3, each of the recesses defined by a drive spider 14 is in the from of an aperture 28 extending therethrough which is bordered by a axially extending perimetric rim 29. The particular spider 14 being considered in formed of two dish-shaped sections 30 and 31 which are substantially identical and are disposed in facing relation as indicated in FIGS. 2 and 3. Thus, an aperture 28 having an axially extending rim 29 is formed in each of the sections 30 and 31 so that the two rims 29 are inwardly directed or project toward each other as respects the associated spider 14. In the ordinary case, the two sections 30 and 31 of each spider 14 will be welded or otherwise secured to each other so as to form an integer prior to their being assembled in a reel 10.

A plurality of recesses (i.e. apertures 28 and rims 29) are provided by each drive spider 14 at angularly separated locations thereabout spaced radially outwardly from the axis of rotation of the shafts 12; and in the structure illustrated, two such recesses are provided which are spaced from each other by 180° and have equal distances from the axis or rotation of the shafts 12. Evidently, a greater number of recesses can be provided if this is desired and the apertures can be spaced different distances from the axis of rotation of the shafts 12 should this be required for any purpose as, for example, polarization of the parts to insure assembly thereof in one particular configuration.

In an analogous manner, the bosses provided by the connector flanges 19, 20 and 22 are defined by openings 34 bordered by axially extending perimetric rims 35. Since the flanges 19 and 20 are oppositely oriented, the rims 35 respectively associated with such flanges project inwardly toward each other in the same manner as the rim 29 of the apertures 28. This precise relationship pertains as to the flange 22 and associated flange 20 adjacent the end of the reel 10. As is evident in FIGS. 2 and 8, the rims 29 have a somewhat greater diameter or cross sectional area than the rims 35 so as to snuggly seat the same therein, and in this manner a precise or exact positional relationship is established between each drive head or spider 14 and the flanges 19 and 20 and shafts 12 associated therewith. It might also be observed that a snug fit between the bosses and recesses (i.e. the rims 35 and 29) effects a positive driving interconnection between the spiders and flanges which is especially desirable in those instances in which the cooperative engagement of the rims defines the main or only connection between the spiders and flanges. It will be appreciated that the flanges 19 and 20 (and 22, if desired) and spider sections 30 and 31 may be stamped metal components, and the various openings, apertures and rims can be struck therefrom.

Fastener structure is required to interconnect the various components comprising the reel 10 in an axial or longitudinal direction so that driving torque can be imparted from the input shaft 24 all along the shafts 12 to the spiders 14 and bat assemblies 16 respectively associated therewith. The fastener structure employed to effect such interconnection may take various forms and, for example, fastener structure of the type disclosed in my commonly assigned copending Pat. application Ser. No. 807,276, filed Mar. 14, 1969 and entitled Modular Drive Shaft may be employed in which case integration is established between the successive shafts 12, flanges 19 and 20 associated therewith and drive spiders 14 by means of elongated rods extending essentially from one end flange 22 to the other and placed under tension so as to compressively unite such successive shafts 12. However, the fastener structure specifically illustrated may be used and it includes a plurality of nut and bolt assemblies 36 each of which comprises a threaded head-equipped bolt 37 extending through the openings 34 and apertures 28 and provided with a nut 38 which together with the head, draws the flanges 19 and 20 toward each other so as to clamp the drive spider 14 therebetween and at the same time constrain successive shafts 12 in end-to-end relation. Usually, washers 39 and 40 are used to increase the area throughout which the compressive force developed by each bolt assembly is applied to the respectively associated flanges 19 and 20.

From the foregoing description it will be evident that reels 10 of any desired length are readily assembled simply by providing shafts 12 in the number and lengths required so that a reel structure of any particular length can be aggregated therefrom. Similarly, the requisite number of drive spiders 14 must be provided, and each shaft or shaft section 12 will be equipped adjacent the ends thereof with flanges 19 and 20 as heretofore explained. Bat assemblies 16 in correspondence with the lengths between successive drive spiders 14 are also necessarily provided, and a shaft 24 and end flange 22 should be available for each end of the reel structure.

With the parts available, a reel structure is assembled by interposing a drive spider 14 between the respectively associated flanges 19 and 20 (or 20 and 22) and integrating the assemblage by means of the appropriate fastener structure. Depending upon the particular type of bat assembly 16 being used, it may or may not be placed in position intermediate a pair of successive drive spiders 14 before the spiders are interconnected with the flanges 19 and 20 as shown in FIG. 2. When once assembled, driving torque is transmitted from one or both of the end shafts 24 to the associated flange 22, and through the interconnected bosses and recesses to the associated drive spider 14 and flange 20 to the next successive shaft 12. At the junction of each shaft 12 with the next successive shaft, the same torque-transmitting relationship pertains as between the associated flanges 19 and 20 and drive spider 14 disposed therebetween.

While in the foregoing specification, as embodiment of the invention has been set forth in considerable detail for purposes of making a complete disclosure thereof, it will be apparent to those skilled in the art that numerous changes may be made in such details without departing from the spirit and principles of the invention.

What I claim is:

1. In a harvesting reel structure a pair of rotatable shafts adapted to be drivingly interconnected in axially aligned end-to-end succession, a pair of connector flanges fixedly mountable upon said shafts at the ends thereof which are adjacent when so connected in end-to-end succession, a drive head interposable between adjacent connector flanges, said drive head and said flanges being selectively provided with a plurality of angularly separated recesses spaced radially outwardly from the axis of rotation of said shafts and with a plurality of axially projecting bosses respectively alignable with said recesses and seatable therein, and fastener structure for interconnecting said shafts in end-to-end succession with said drive head interposed between said flanges, whereby driving torque can be transmitted along said shafts and to said head.

2. The reel structure of claim 1 in which said recesses are provided in said head and said bosses are provided by said flanges.

3. The reel structure of claim 1 in which each of said bosses comprises an opening bordered by an axially extending perimetric rim seatable within any recess aligned therewith.

4. The reel structure of claim 1 in which each of said recesses is an aperture bordered by an axially extending perimetric rim adapted to seat therein any one of said bosses aligned therewith.

5. The reel structure of claim 4 in which each of said bosses comprises an opening bordered by an axially extending perimetric rim seatable within any one of said recesses aligned therewith.

6. The reel structure of claim 5 in which said recesses are provided in said head and said bosses are provided by said flanges.

7. The reel structure of claim 6 in which said fastener structure comprises a plurality of nut and bolt assemblies respectively adapted to extend through said openings and apertures when aligned with each other so as to clamp said flanges to said head.

8. The reel structure of claim 1 in which said flanges are fixedly mounted upon the adjacent ends of said shafts spaced distances from the respectively adjacent ends thereof, the adjacent ends of said shafts being in substantially contiguous relation and said head being disposed between said flanges with said bosses respectively seated within the recesses aligned therewith, and said fastener structure drivingly interconnecting said shafts, flanges and head as aforesaid.

9. The reel structure of claim 8 in which each of said bosses comprises an opening bordered by an axially extending perimetric rim and each of said recesses comprises an aperture bordered by an axially extending perimetric rim seating an associated boss therein.

10. The reel structure of claim 9 in which said recesses are provided in said head and said bosses are provided by said flanges.